United States Patent
Cao (10) Patent No.: US 11,889,083 B2
(45) Date of Patent: Jan. 30, 2024

(54) IMAGE DISPLAY METHOD AND DEVICE, IMAGE RECOGNITION METHOD AND DEVICE, STORAGE MEDIUM, ELECTRONIC APPARATUS, AND IMAGE SYSTEM

(71) Applicant: BOE TECHNOLOGY GROUP CO., LTD., Beijing (CN)

(72) Inventor: Wei Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 297 days.

(21) Appl. No.: 17/417,565

(22) PCT Filed: Sep. 29, 2020

(86) PCT No.: PCT/CN2020/118718
§ 371 (c)(1),
(2) Date: Jun. 23, 2021

(87) PCT Pub. No.: WO2021/068795
PCT Pub. Date: Apr. 15, 2021

(65) Prior Publication Data
US 2022/0060713 A1 Feb. 24, 2022

(30) Foreign Application Priority Data
Oct. 11, 2019 (CN) .......................... 201910964779.1

(51) Int. Cl.
*H04N 19/136* (2014.01)
*G06K 7/10* (2006.01)
(Continued)

(52) U.S. Cl.
CPC ....... *H04N 19/136* (2014.11); *G06K 7/10831* (2013.01); *G06K 7/1447* (2013.01); *H04N 19/176* (2014.11)

(58) Field of Classification Search
CPC ...... H04N 19/136; H04N 19/176; G06K 7/10; G06K 7/10831; G06K 7/1447; H04B 10/116
See application file for complete search history.

(56) References Cited

U.S. PATENT DOCUMENTS 7,500,615 B2 * 3/2009 Tamayama ........... G06K 7/1095
345/82
8,596,541 B2 * 12/2013 Chiu .................... G06K 7/1447
235/462.31
(Continued)

FOREIGN PATENT DOCUMENTS

CN 103533413 A 1/2014
CN 105142000 A 12/2015
(Continued)

OTHER PUBLICATIONS

China Patent Office, Second Office Action dated Dec. 27, 2021, for corresponding Chinese application No. 201910964779.1.
(Continued)

*Primary Examiner* — Sardis F Azongha
(74) *Attorney, Agent, or Firm* — HOUTTEMAN LAW LLC (57) ABSTRACT

An image display method includes: obtaining an image to be displayed in an object to be played; determining a code corresponding to the image to be displayed; and controlling
(Continued)

a display device to play the object to be played and output a light signal corresponding to the code when the image to be displayed is displayed.

24 Claims, 9 Drawing Sheets

(51) Int. Cl.
*G06K 7/14* (2006.01)
*H04N 19/176* (2014.01)

(56) References Cited

U.S. PATENT DOCUMENTS

| | | | |
|---|---|---|---|
| 10,218,440 B2* | 2/2019 | Cha | H04B 10/116 |
| 2005/0263598 A1* | 12/2005 | Harada | G06K 7/1095 |
| | | | 235/462.09 |
| 2011/0128384 A1 | 6/2011 | Tiscareno et al. | |
| 2013/0027423 A1 | 1/2013 | Bae et al. | |
| 2016/0218803 A1* | 7/2016 | Zhi | H04B 10/116 |
| 2018/0102846 A1 | 4/2018 | Aoyama et al. | |
| 2019/0273852 A1* | 9/2019 | Schneider | G02B 5/20 |
| 2020/0153505 A1 | 5/2020 | Li | |

FOREIGN PATENT DOCUMENTS

| | | |
|---|---|---|
| CN | 105187124 A | 12/2015 |
| CN | 105933710 A | 9/2016 |
| CN | 106209251 A | 12/2016 |
| CN | 207150596 U | 3/2018 |
| CN | 109361457 A | 2/2019 |
| CN | 110730345 A | 1/2020 |
| IN | 107466477 A | 12/2017 |

OTHER PUBLICATIONS

Huanyu Zhu, et al., "Invisible Information Casting System Based on Visible Light Communication" dated Sep. 2015, Acta Optica Sinica, vol. 35, No. 9.

China Patent Office, First Office Action dated Jun. 3, 2021, for corresponding Chinese application No. 201910964779.1.

Zhu, et al., "Invisible Information Casting System Based on Visible Light Communication", Acta Optica Sinica, vol. 35, No. 9, Sep. 2015.

* cited by examiner

| displayed image | A0 | A1 | A2 | A3 | A4 | A5 | A6 | A7 |
|---|---|---|---|---|---|---|---|---|
| ASCII | 0 | 1 | 1 | 0 | 0 | 0 | 0 | 1 |

FIG. 6

| 0 | 1 | 1 | 0 | 0 | 0 | 0 | 1 | a |
| 0 | 1 | 1 | 0 | 0 | 0 | 1 | 0 | b |
| 0 | 1 | 1 | 0 | 0 | 0 | 1 | 1 | c |
| 0 | 1 | 1 | 0 | 0 | 1 | 0 | 0 | b |
| 0 | 1 | 1 | 0 | 0 | 1 | 0 | 1 | e |
| 0 | 1 | 1 | 0 | 0 | 1 | 1 | 0 | f |
| 0 | 1 | 1 | 0 | 0 | 1 | 1 | 1 | g |
| 0 | 1 | 1 | 0 | 1 | 0 | 0 | 0 | h |

IMAGE DISPLAY METHOD AND DEVICE, IMAGE RECOGNITION METHOD AND DEVICE, STORAGE MEDIUM, ELECTRONIC APPARATUS, AND IMAGE SYSTEM

CROSS REFERENCE TO RELATED DISCLOSURE

The present disclosure claims priority to Chinese patent publication No. 201910964779.1, filed on Oct. 11, 2019, the content of which is incorporated herein by reference.

TECHNICAL FIELD

The present disclosure relates to the field of image processing technology, and in particular, to an image display method, an image display device, an image recognition method, and an image recognition device, a storage medium, an electronic apparatus, and an image system.

BACKGROUND

At present, with continuous progress and development of two-dimensional code technology, a two-dimensional code may be displayed in a display screen, so as to provide related information of the screen to a user in a form of the two-dimensional code. The user can use a mobile phone to scan the two-dimensional code to enter a related link to execute corresponding operation. For example, a two-dimensional code corresponding to a product is displayed in an advertisement screen, and the user can enter a purchase page corresponding to the product after scanning the two-dimensional code by using the mobile phone, so that the user can order and purchase the product on the mobile phone. However, displaying the two-dimensional code on the display screen occupies an area of the display screen, thereby reducing an area of the display screen displaying other contents, and further affecting the user viewing the screen.

SUMMARY

According to a first aspect of the present disclosure, there is provided an image display method, including: obtaining an image to be displayed in an object to be played; determining a code corresponding to the image to be displayed; and controlling a display device to play the object to be played and output a light signal corresponding to the code when the image to be displayed is displayed.

In some implementations, the determining the code corresponding to the image to be displayed includes: extracting a first macroblock from a preset position of the image; and determining the code corresponding to the image to be displayed according to the first macroblock.

In some implementations, the determining the code corresponding to the image to be displayed according to the first macroblock includes: extracting a value corresponding to each pixel point in the first macroblock, where the value corresponding to each pixel point is obtained by replacing a pixel value of each pixel point according to a preset mapping relation, and in the preset mapping relation, a same type of pixels correspond to a same preset value; and coding the value corresponding to each pixel point by using a preset coding rule to obtain the code corresponding to the image.

In some implementations, the determining the code corresponding to the image to be displayed according to the first macroblock includes: obtaining image feature information of the first macroblock; and determining a preset code corresponding to the image feature information, and taking the obtained code as the code corresponding to the image to be displayed.

In some implementations, the controlling the display device to play the object to be played and output the light signal corresponding to the code when the image to be displayed is displayed includes: controlling a display panel of the display device to display the image to be displayed, and synchronously controlling a backlight assembly of the display device to output the light signal corresponding to the code.

In some implementations, the object to be played includes at least two frames of images, the method further includes: before the image to be displayed is obtained, replacing a pixel value of each pixel point in a macroblock information of a preset position of each image in the at least two frames of images with a preset value according to a preset mapping relation, where in the preset mapping relation, a same type of pixels correspond to a same preset value, and the object to be played is obtained; or extracting image feature information from a macroblock of a preset position of each image in the at least two frames of images, and establishing a corresponding relation between the image feature information and a preset code.

In some implementations, the light signal includes at least one of the following information: a type of a called object and retrieval information of the called object.

According to a second aspect of the present disclosure, there is provided an image recognition method, which is applied to a terminal, and the method includes the following steps: obtaining a light signal output by a display device displaying an image, where the light signal corresponds to a code of the image; decoding the light signal to obtain the code; and obtaining and playing extension information corresponding to the image based on the code.

In some implementations, the terminal includes a camera, and the obtaining the light signal output by the display device displaying the image includes: controlling the camera to switch to a preset light sensitivity and a preset exposure time; and capturing the image displayed by the display device by the camera according to the preset light sensitivity and the preset exposure time to obtain an image containing the light signal.

In some implementations, the method further includes: after obtaining the image containing the light signal, extracting a sub-image containing a stripe pattern in the image.

In some implementations, the decoding the light signal to obtain the code includes: decoding the sub-image to obtain the code.

In some implementations, the playing the extension information corresponding to the image includes: determining a type of the extension information according to the code; and playing the extension information through a playing tool corresponding to the type of the extension information.

According to a third aspect of the present disclosure, there is provided an image display device, including: a first obtaining circuit configured to obtain an image to be displayed in an object to be played; a determination circuit configured to determine a code corresponding to the image to be displayed; and a first control circuit configured to control a display device to play the object to be played and output a light signal corresponding to the code when the image to be displayed is displayed.

In some implementations, the determination circuit includes: a first extraction sub-circuit configured to extract a first macroblock from a preset position of the image; and a first determination sub-circuit configured to determine the code corresponding to the image to be displayed according to the first macroblock.

In some implementations, the determination circuit includes: a second extraction sub-circuit configured to extract a value corresponding to each pixel point in the first macroblock, where the value corresponding to each pixel point is obtained by replacing a pixel value of each pixel point according to a preset mapping relation, and in the preset mapping relation, a same type of pixels correspond to a same preset value; and a coding sub-circuit configured to code the value corresponding to each pixel point by using a preset coding rule to obtain the code corresponding to the image.

In some implementations, the determination circuit includes: an obtaining sub-circuit configured to obtain image feature information of the first macroblock; and a second determination sub-circuit configured to determine a preset code corresponding to the image feature information and taking the obtained code as the code corresponding to the image to be displayed.

In some implementations, the control circuit is configured to: control a display panel of the display device to display the image to be displayed, and synchronously control a backlight assembly of the display device to output the light signal corresponding to the code.

In some implementations, the object to be played includes at least two frames of images, the image display device further includes: a replacing circuit configured to replace a pixel value of each pixel point in a macroblock information of a preset position of each image in the at least two frames of images with a preset value according to a preset mapping relation before the image is obtained, where in the preset mapping relation, a same type of pixels correspond to a same preset value, and the object to be played is obtained; or extract image feature information from a macro block of a preset position of each image in the at least two frames of images, and establish a corresponding relation between the image feature information and a preset code.

According to a fourth aspect of the present disclosure, there is provided an image recognition device, which is applied to a terminal, the image recognition device includes: a second obtaining circuit configured to obtain a light signal output by a display device displaying an image, where the light signal corresponds to a code of the image; a decoding circuit configured to decode the light signal to obtain the code; and a play circuit configured to obtain and play extension information corresponding to the image based on the code.

In some implementations, the terminal includes a camera, and the second obtaining circuit includes: a second control sub-circuit configured to control the camera to switch to a preset light sensitivity and a preset exposure time; and a capturing sub-circuit configured to capture the image displayed by the display device through the camera at the preset light sensitivity and the present exposure time to obtain an image containing the light signal.

In some implementations, the image recognition device further includes: an extraction circuit configured to extract a sub-image containing a stripe pattern in the image after the image containing the light signal is obtained.

In some implementations, the decoding circuit is configured to: decode the sub-image to obtain the code.

In some implementations, the play circuit includes: a third determining sub-circuit configured to determine a type of the extension information based on the code; and a play sub-circuit configured to play the extension information through a playing tool corresponding to the type of the extension information.

According to a fifth aspect of the present disclosure, there is provided an electronic apparatus, which includes a memory, a processor and a computer program stored in the memory and executable on the processor, where the processor implements the image display method described above or the image recognition method described above when executing the computer program.

According to a sixth aspect of the present disclosure, there is provided a non-transitory computer-readable storage medium storing computer instructions for causing a computer to execute the image display method described above or the image recognition method described above.

According to a seventh aspect of the present disclosure, there is provided an image system, including the image display device described above and the image recognition device described above.

DRAWINGS

To more clearly illustrate the technical solutions of the embodiments of the present disclosure, the drawings of the embodiments will be briefly introduced below, and it is apparent that the drawings in the following description only relate to some embodiments of the present disclosure and do not limit the present disclosure.

DETAILED DESCRIPTION

To make the objects, technical solutions and advantages of the embodiments of the present disclosure more clear, the technical solutions of the embodiments of the present disclosure will be clearly and completely described below with reference to the drawings of the embodiments of the present disclosure. It is to be understood that the described embodiments are only a few embodiments of the present disclosure, and not all embodiments. All other embodiments, which can be derived by a person skilled in the art from the described embodiments of the disclosure without creative labor, are within the protection scope of the disclosure.

Unless defined otherwise, technical or scientific terms used herein shall have the ordinary meaning as understood by one of ordinary skill in the art to which the present disclosure belongs. The use of "first", "second", and the like in the present disclosure is not intended to indicate any order, quantity, or importance, but rather is used to distinguish one element from another. Also, the use of the terms "a", "an" or "the" and similar referents does not denote a limitation of quantity, but rather denotes the presence of at least one. The word "include", "comprise", or the like, means that the element or item preceding the word includes the element or item listed after the word and its equivalent, but does not exclude other elements or items. The terms "coupled" or "connected" and the like are not restricted to physical or mechanical connections, but may include electrical connections, whether direct or indirect. The words "upper", "lower", "left", "right", and the like are used only to indicate relative positional relationships, and when the absolute position of the object being described is changed, the relative positional relationships may also be changed accordingly.

Figure 1:
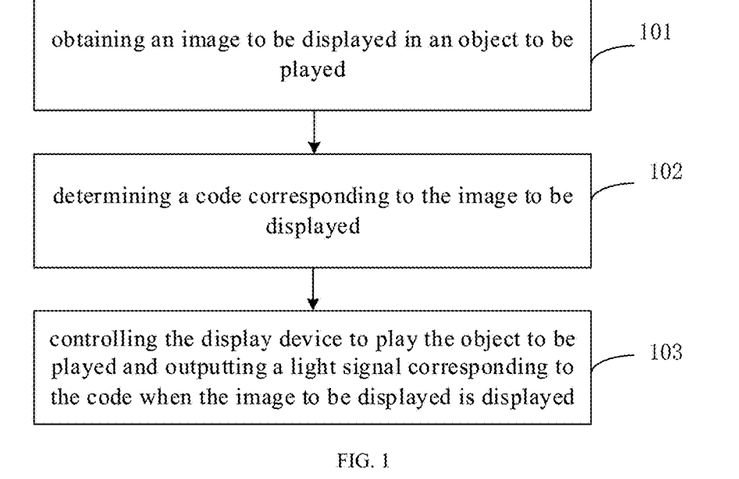
FIG. 1 is a flowchart of an image display method according to an exemplary embodiment of the present disclosure.

FIG. 1 is a flowchart of an image display method, which may be implemented, for example, by a display device, such as may be executed by a controller in the display device, according to an exemplary embodiment, and as shown in FIG. 1, the method including following steps 101 to 103.

At step 101, obtaining an image to be displayed in an object to be played; the image to be displayed may be, for example, a video, a moving image, a still image, or the like. The object to be played may be, for example, a video, a moving image, or a still image.

At step 102, determining a code corresponding to the image to be displayed; the code corresponding to the image to be displayed is used for identifying the image to be displayed, and the code may uniquely correspond to the image to be displayed. For example, a code corresponding to the object may be generated in advance from image data of the image to be displayed, so that, after the code corresponding to the object is obtained, the image currently displayed by the display device can be recognized by using the unique correspondence relationship between the code and the image.

At step 103, controlling the display device to play the object to be played and outputting a light signal corresponding to the code when the image to be displayed is displayed.

Figure 2:
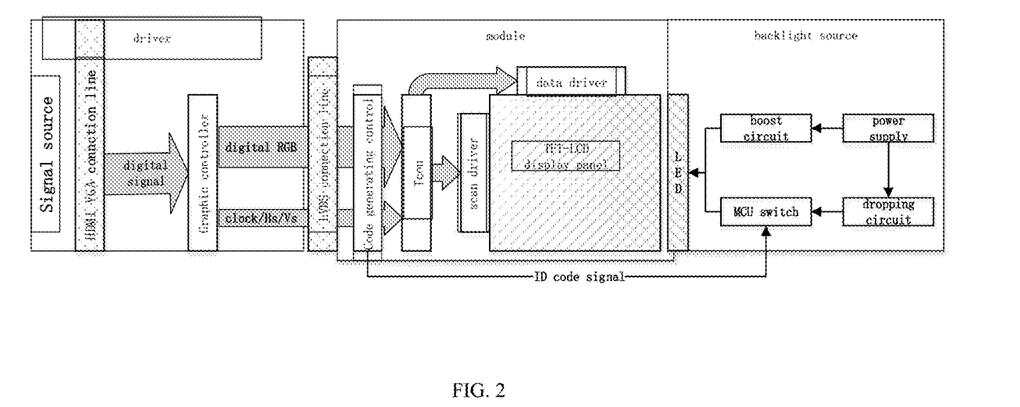
FIG. 2 is a schematic diagram of a display device according to an exemplary embodiment of the present disclosure.
Figure 3:
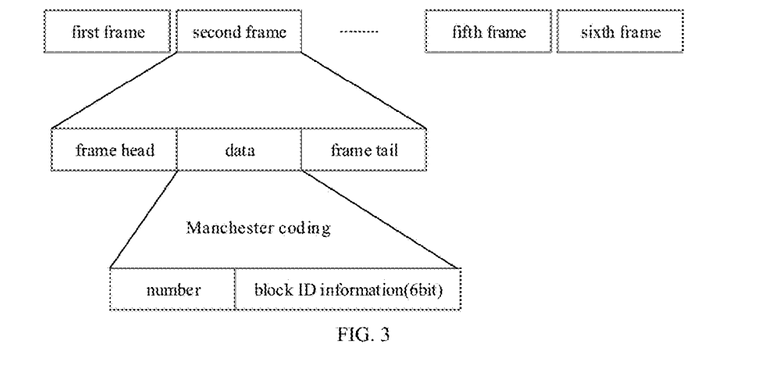
FIG. 3 is a schematic diagram of an encoding manner of ID information according to an exemplary embodiment of the present disclosure.

For example, the display device may be controlled to display an image corresponding to the image to be displayed through an LCD (Liquid Crystal Display) and output the light signal corresponding to the code through a backlight assembly of the display device, based on which, as shown in FIG. 2, the display device may include a controller, and an LCD driving circuit and an LED (Light Emitting Diode) control circuit of the display device are simultaneously controlled by the controller to output synchronously, so as to achieve a function of the image and visible light information transmitted by the backlight assembly being matched with each other. The controller can match the image information with ID (Identity Document) information transmitted by the backlight assembly, where the ID is an example of the above code, and the controller may identify an image or video from the image information first and then match the image or video with the corresponding ID information. For example, the display device may emit the light signal by flashing a LED lamp of a backlight of a liquid crystal display, where a main control chip of the controller may be C8051F342GQ, for example, the main control chip may determine the ID information to be transmitted by reading data in a register, that is, a code corresponding to the image to be displayed, and then control flashing of bright and dark of the LED lamp of the backlight by a pulse width modulation. As shown in FIG. 3, in order to increase the recognition accuracy for the light signal emitted from the display device, the ID information of 24 bits may be equally divided into four data blocks, each of which contains 6-bit information. Then, a 2-bit sequence number is added before each data block to indicate a position of the data block in the ID information. After Manchester coding, a 4-bit frame head and a 4-bit frame tail are added to form a complete transmission frame, where the frame head is 1111, and the frame tail is 0000.

In the image display method of the embodiment of the present disclosure, the code corresponding to the image to be displayed is determined according to the image data of the image to be displayed, when the image to be displayed is played, the light signal corresponding to the code is output, the display device can output the code corresponding to the played content in the form of the light signal when the content is played, and under the condition that watching the played content by a viewer is not influenced, the viewer can know the code corresponding to the played content by receiving the light signal by himself, so as to obtain other related information of the played content according to the code.

Figure 4:
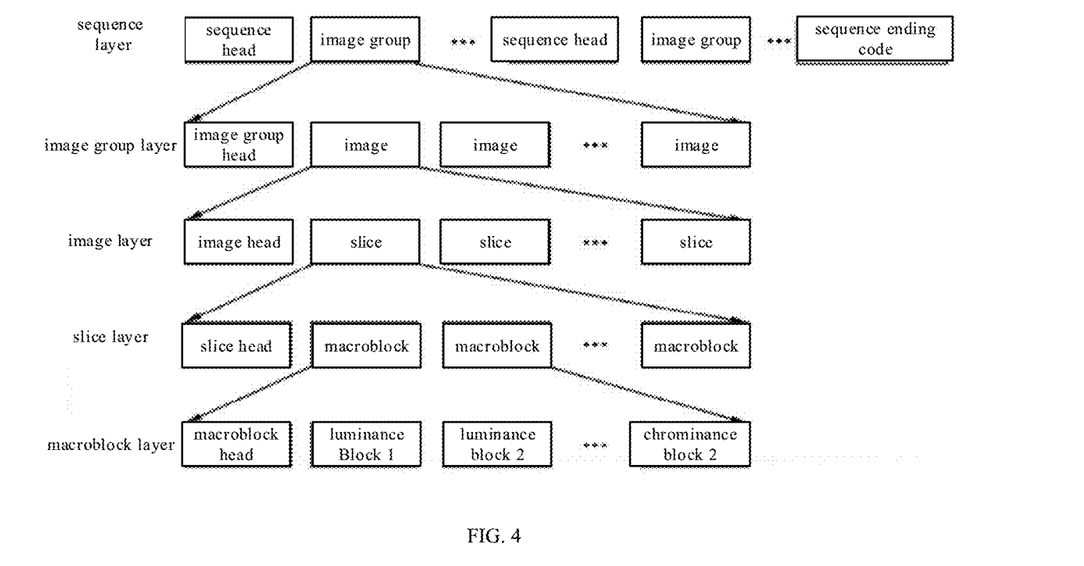
FIG. 4 is a schematic diagram of a signal source according to an exemplary embodiment of the present disclosure.

In an implementation, a packet of the image to be displayed may be obtained from a signal source, FIG. 4 is a schematic diagram of the signal source according to an example embodiment of the present disclosure, as shown in FIG. 4, the signal source may include multiple layers of information such as a sequence layer, an image group, an image, a slice, and a macroblock, and luminance and chrominance information of each pixel of the image may be stored in the macroblock. For an image with FHD (Full High Definition) resolution, one macroblock occupies only 0.2% of the image area, and for a 4K image, one macroblock occupies 0.05% of the image area, so modifying information of one macroblock has little influence on the display effect of the whole image. Based on the above, in order to include the code corresponding to the image to be displayed in the image to be displayed, macroblocks of specific positions of all the images to be displayed may be preprocessed, and during the preprocessing, feature code macroblock information obtained by the preprocessing may be used for replacing the original macroblocks in the images, so that the macroblock of the specific position of each image is kept unique, and the situation that the images are difficult to be recognized due to the fact that the macroblock information of the images is the same can be avoided. Thus, determining the code corresponding to the image may include: extracting a first macroblock from a preset position of the image; and determining the code corresponding to the image according to the first macroblock.

Figure 5:
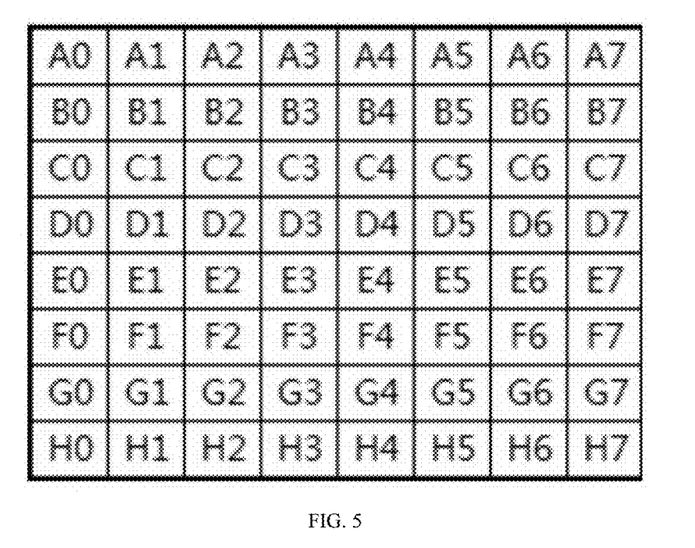
FIG. 5 is a schematic diagram of a macroblock [1] according to an exemplary embodiment of the present disclosure.
Figure 6:
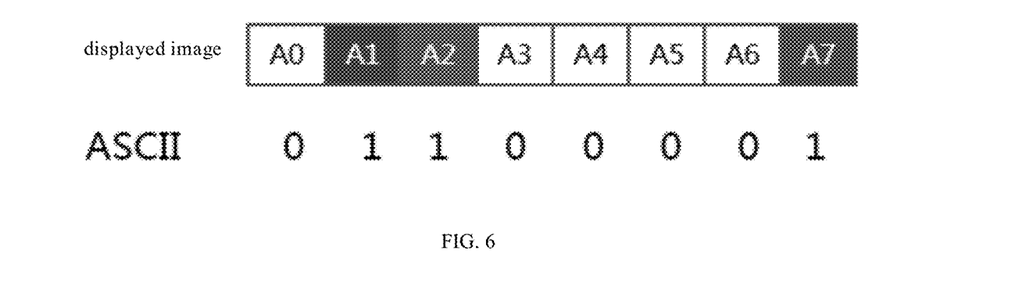
FIG. 6 is a schematic diagram illustrating extraction of an array from a macroblock [1] according to an exemplary embodiment of the present disclosure.
Figure 7:
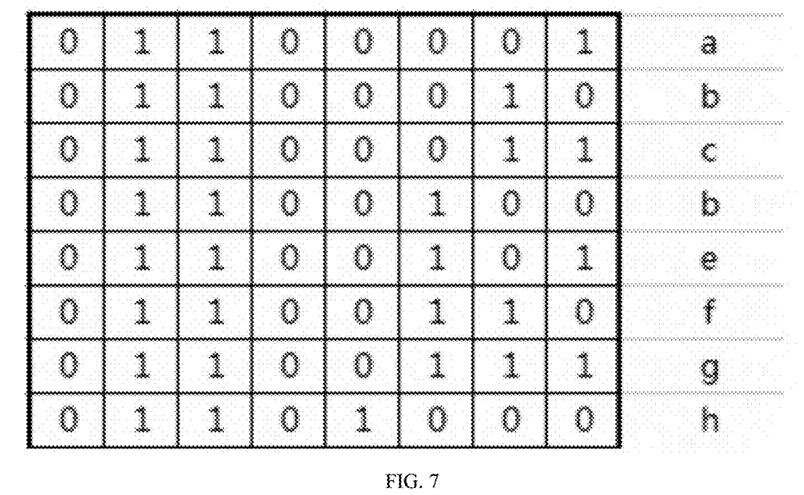
FIG. 7 is a schematic diagram of a macroblock [1] according to an exemplary embodiment of the present disclosure.

In an implementation, the determining the code corresponding to the image based on the first macroblock may include: extracting a value corresponding to each pixel point in the first macroblock, where the value corresponding to each pixel point is obtained by replacing a pixel value of each pixel point according to a preset mapping relation, and in the preset mapping relation, a same type of pixels correspond to a preset value; and coding the value corresponding to each pixel point by using a preset coding rule to obtain the code corresponding to the image. For recognition, a 8×8 region of a first group of macroblocks of the whole image may be selected as a specific region (as an example of the first macroblock), the original macroblock information of the position of the image is replaced by the macroblock information containing a special rule, or the macroblock at any position of the image may be designated as the specific region for replacement. However, regardless of the position of the macroblock to be replaced during the preprocessing, it is necessary to specify the position of the macroblock to be replaced when recognizing the image, and for example, information of the position of the macroblock to be replaced may be stored in the display device in advance, and the system may recognize by using only the macroblock information at such position. For example, the controller extracts eight arrays A0[ ] to A7[ ] from the macroblock [1] (macroblock [1] may refer to FIG. 5), and as shown in FIG. 6, colors of the arrays are sequentially judged and recognized as "0110 0001", the same is true for rows B to H of the macroblock [1], and a two-dimensional array of 8×8 is finally recognized, where the array is composed of 0 and 1. Eight numbers per row may be set in advance as a group, and according to an ASCII encoding rule (which is an example of the preset encoding rule), a code (abcdefgh, which is an example of the code corresponding to the image) consisting of 8 characters can be obtained, as shown in FIG. 7, abcdefgh is the code corresponding to the image.

In an implementation, the determining the code corresponding to the image based on the first macroblock may include: obtaining image feature information of the first macroblock; and determining a preset code corresponding to the image feature information, and taking the obtained code as the code corresponding to the image. Continuously taking the macroblock [1] shown in FIG. 5 as an example, when recognizing an image, the controller recognizes that the image features of the "macroblock [1]" of the current image is as follows: for example, the image features of A0 to A7 are set as (70, 27, −34), and the image features of the rows B to H are all set as white (255,0,0), and, assuming that the ID corresponding to the image feature is abcdefgh set in advance, it is determined that abcdefgh is the ID corresponding to the current image, and the ID being abcdefgh is transmitted through the backlight of the display screen of the display device. Alternatively, as shown in the upper right of FIG. 7, the mapping of A[ ]=C[ ]=E[ ]=G[ ]=(70, 27, −34), B[ ]=D[ ]=F[ ]=H[ ]=(255,0,0) with the ID: 12345678 is established, and after the image features are recognized, the ID being 12345678 may be transmitted through the backlight of the display screen of the display device.

Figure 8:
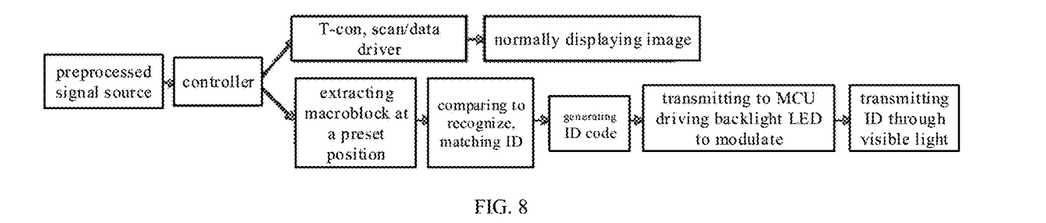
FIG. 8 is a flowchart of recognizing an image according to an exemplary embodiment of the present disclosure.

In an implementation, the controlling the display device to play the object to be played and outputting the light signal corresponding to the code when displaying the image may include: controlling a display panel of the display device to display the image, and synchronously controlling a backlight assembly of the display device to output the light signal corresponding to the code. For example, as shown in FIG. 8, after the signal source is input to the controller, it is directly input to a T-con (timing controller) for displaying of normal images; meanwhile, the system extracts the macroblock information of a designated position of the image from the signal source, compares the macroblock information with pre-stored macroblock information, recognizes the image and generates the code corresponding to the image, transmits the code information to an MCU (micro controller unit) for controlling a backlight LED of the display screen, the MCU modulates the backlight LED, transmits the code information through bright and dark flicker, and the controller may repeat the steps every time the image to be displayed by the display screen is updated, so that the matching of the display screen playing the image with the code for the image is realized.

Figure 9:
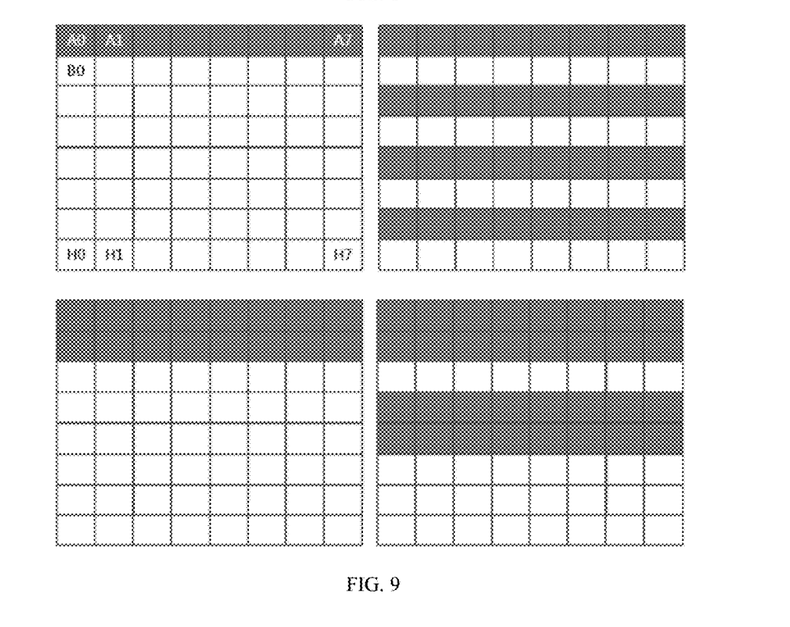
FIG. 9 is a schematic diagram of an entire image according to an exemplary embodiment of the present disclosure.

In an implementation, the object to be played includes at least two frames of images, and the image displaying may further include: before the image is obtained, replacing the pixel value of each pixel point in the macroblock information of the preset position of each image in the at least two frames of images with a preset value according to the preset mapping relation, where in the preset mapping relation, a same type of pixels correspond to a same preset value, and the object to be played is obtained; for example, each pixel in the macroblock contains color information such as luminance Y, chrominance Cr, Cb (here, for example, using a YUV color space model, for a RBG or HSV color space circuit, the same is true). Referring to the macroblock [1] shown in FIG. 5, each pixel in the macroblock may be represented by 0 or 1, respectively, for example, when an image is recognized, the pixel value of a white pixel is replaced by 0, and the pixel values of other color pixels are replaced by 1. When the image is preprocessed, A0, A3, A4, A5, and A6 in the "image group [1], the image [1], the slice [1], the macroblock [1]" are set to be white, that is, A0(Y0, Cr0, Cb0)=A3(Y3, Cr3, Cb3)==A6(Y6, Cr6, Cb6)=(255, 0, 0), A1, A2, and A7 are other colors A1 (70, 27, −34), A2(85, −22, −5), and A7(88.51, −40, −55), so that the object to be played is obtained. In another implementation, image feature information of the macroblock of a preset position of each image in the at least two frames of images is extracted, and a corresponding relationship is established between the image feature information and a preset code. For example, the image feature of the whole macroblock may be mapped directly to one code, e.g., different patterns composed by 64 pixels are mapped to a certain code. For example, A0 to A7 are set as (70, 27, −34), the rows B to H are all set as white (255, 0, 0), and as shown in the upper left corner of FIG. 9, the image feature is associated with the ID being ABCDEFG.

In an implementation, the light signal may include at least one of the following information: a type of a called object and retrieval information of the called object. For example, coding rules may be added in a Module circuit code generator circuit, different types of files may be defined in advance and fixed in the code, and a data format of the code may be as shown in table 1 below, for example. The type of the called object is added to the transmitted code information, so that the mobile terminal can obtain the type of the called data (namely the type of data of the object) after decoding the received light signal, and a corresponding play interface may be called on a display screen of the mobile terminal to play the object to be played. In the transmitted code information, specific retrieval information of the called object is added, so that the mobile terminal can know the source of the object to be played according to the specific retrieval information of the called object after receiving the light signal, and obtain a data packet of the object to be played from a server.

TABLE 1

| packet header | model, version, Mac address, etc. of device | type of called object | specific retrieval information of called object | ... | other data structure information |
|---|---|---|---|---|---|

Figure 10:
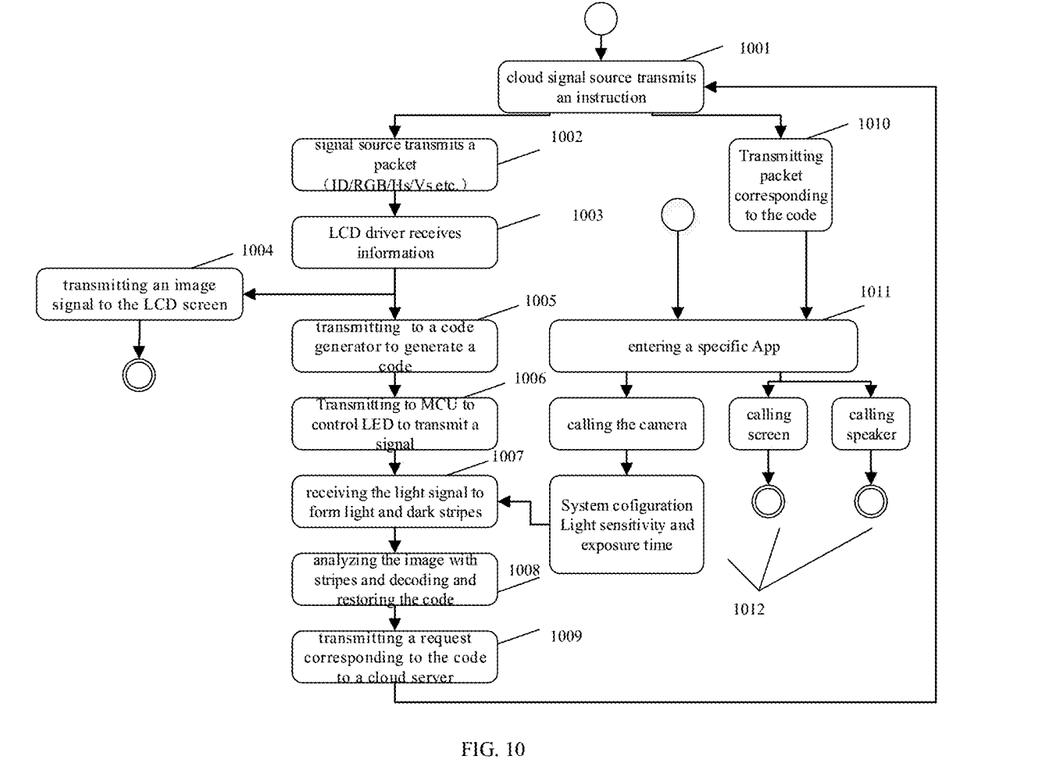
FIG. 10 is a flowchart of image display and image recognition according to an exemplary embodiment of the present disclosure.

In an exemplary scenario of the embodiment of the present disclosure, a terminal performs information interaction with a cloud server and a display device, so that extension information of an image currently displayed by the display device can be obtained by obtaining a code transmitted by the display device and corresponding to the image currently displayed by the display device. FIG. 10 shows a flow of the display device displaying the image and the terminal recognizing the image, which includes the following steps 1001 to 1012.

Figure 11:
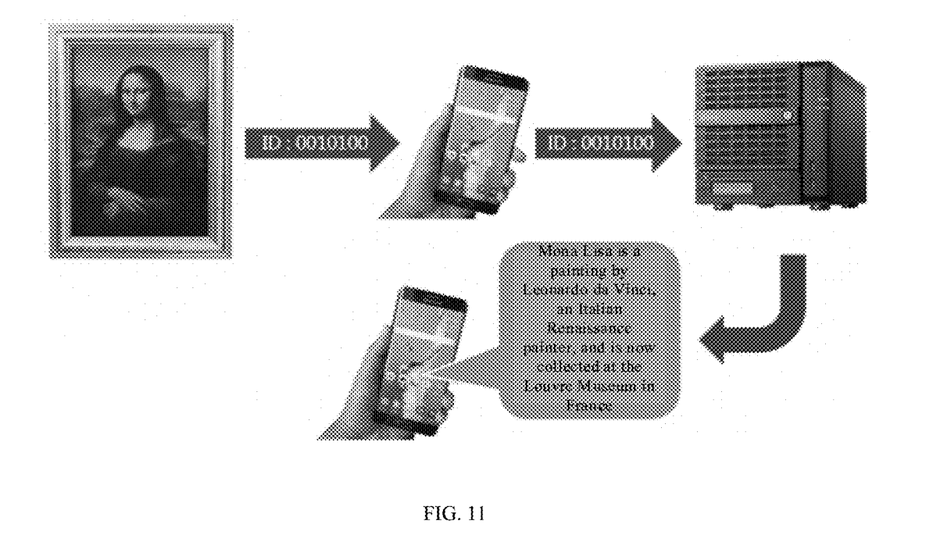
FIG. 11 is a schematic diagram illustrating an implementation scenario of image recognition according to an exemplary embodiment of the present disclosure.

As shown in FIG. 10, at step 1001, transmitting, by a cloud signal source, an instruction to the display device;

At step 1002, transmitting a packet of an object to be played to the display device, for example, the cloud server calls the packet of the object to be played from a database, and transmits the packet to the display device, the data packet may include at least one of code information, RGB information of the image, Hs (horizontal sync signal) and VS (vertical sync signal);

At step 1003, receiving, by a LCD driver of the display device, the data packet;

At step 1004, transmitting an image signal to a LCD screen, and displaying the image on the LCD screen;

At step 1005, transmitting the image information to a code generator to generate a code corresponding to the image;

At step 1006, transmitting the generated code to an MCU to control a LED lamp of a backlight assembly of the display device to transmit a light signal corresponding to the code;

At step 1007, receiving, by the terminal, the light signal transmitted by the display device to form an image with bright and dark stripes, and for example, the user calls the camera to receive the code through an App on the mobile terminal;

At step 1008, decoding, by the terminal, the image with bright and dark stripes to obtain the code corresponding to the image currently displayed by the display device; At step 1009, transmitting a request corresponding to the code to the cloud server; for example, the terminal may transmit the decoded code to the cloud server;

At step 1010, transmitting, by the cloud server, the packet corresponding to the code to the terminal; and transmitting, by the cloud server, at least one of audio, video or text information to the terminal according to the received code transmitted by the terminal;

At step 1011, the terminal entering a corresponding application in response to the user's operation;

At step 1012, the terminal calling at least one of the display screen and the speaker to play the object to be played according to the type of data of the object to be played, or configuring the camera to have a preset sensitivity and exposure time after entering the application, and then calling the camera to obtain the image. As described above, the present disclosure further relates to an image extension information obtaining method executed by the terminal, and the application scenario of the method is first exemplarily explained by two exemplary implementation scenes. In an exemplary scenario, as shown in FIG. 11, in a relatively quiet digital exhibition of paintings, a display screen is playing a Mona Lisa painting, if a user does not know the background and meaning of the painting, in order to know other information of the painting without affecting others to watch the painting, the user can aim a camera of the mobile terminal, such as a mobile phone, at the painting, and automatically recall related text, voice and video introductions of the painting from a server and display it on the screen of the mobile phone of the user for the user to watch after receiving the code corresponding to the painting transmitted by the display screen. In another exemplary scenario, when the display screen plays a flat advertisement, after the user receives the code corresponding to the currently played image through the mobile phone, the mobile phone can automatically call the advertisement video from the server for the user to watch, or an article link of an E-commerce platform related to the currently played advertisement image can be automatically called from the server, so that the user can conveniently view product information or place an order.

Figure 12:
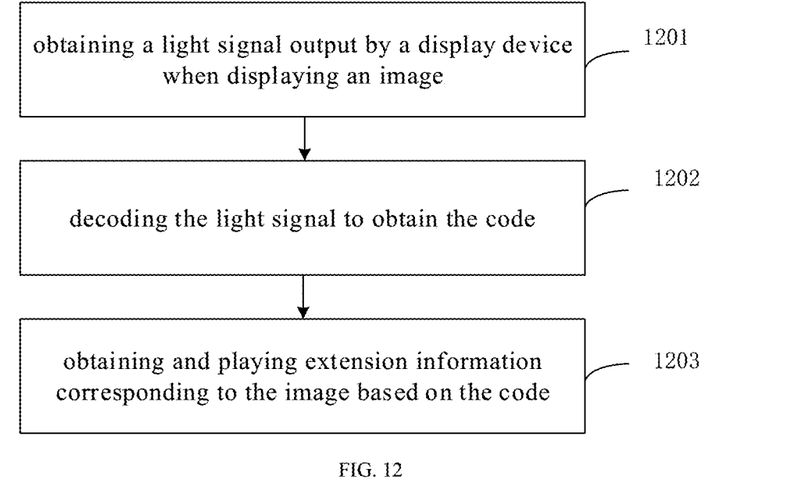
FIG. 12 is a flowchart of an image recognition method according to an exemplary embodiment of the present disclosure.

FIG. 12 is a flowchart of an image recognition method according to an exemplary embodiment, which may be performed by a terminal device, for example, a mobile phone, a digital camera, or a tablet computer, and as shown in FIG. 12, the method includes: Step 1201, obtaining a light signal output by a display device displaying an image, where the light signal corresponds to a code of the image;

Step 1202: decoding the light signal to obtain the code; and Step 1203: obtaining and playing extension information corresponding to the image based on the code.

In an implementation, the terminal may include a camera, and the obtaining the light signal output by the display device displaying the image may include: controlling the camera to switch to a preset light sensitivity and a preset exposure time; and capturing the image displayed by the display device by the camera at the preset light sensitivity and the preset exposure time to obtain an image containing the light signal. For example, before obtaining the light signal output by the display device displaying the image, an extension information obtaining request is obtained in response to a user's operation; the user's operation may be an operation of starting a corresponding application program by the user, or an operation of clicking a corresponding content displayed on the terminal by the user, and after clicking the content, the terminal may be triggered to generate the extension information obtaining request to obtain the extension information. The terminal may be preset with value ranges of the light sensitivity and the exposure time, and after the terminal obtains the extension information obtaining request, the camera can be switched to the preset light sensitivity and the preset exposure time. The camera captures the display device according to the preset light sensitivity and the preset exposure time, and the light signal output by the display device can be obtained. For example, an emitting end, i.e., the display device described above, transmits a visible light signal using a frequency of 8 kHz, and in order to match the frequency, the exposure time of the camera is adjusted to 1/8000s, and the light sensitivity of ISO (image sensor) is adjusted to 800, so as to improve the image brightness. Therefore, the camera can clearly record the light flicker signal emitted by the LED lamp of the backlight of the display device on the photographed image in the form of black and white stripes, see FIG. 13.

Figure 14:
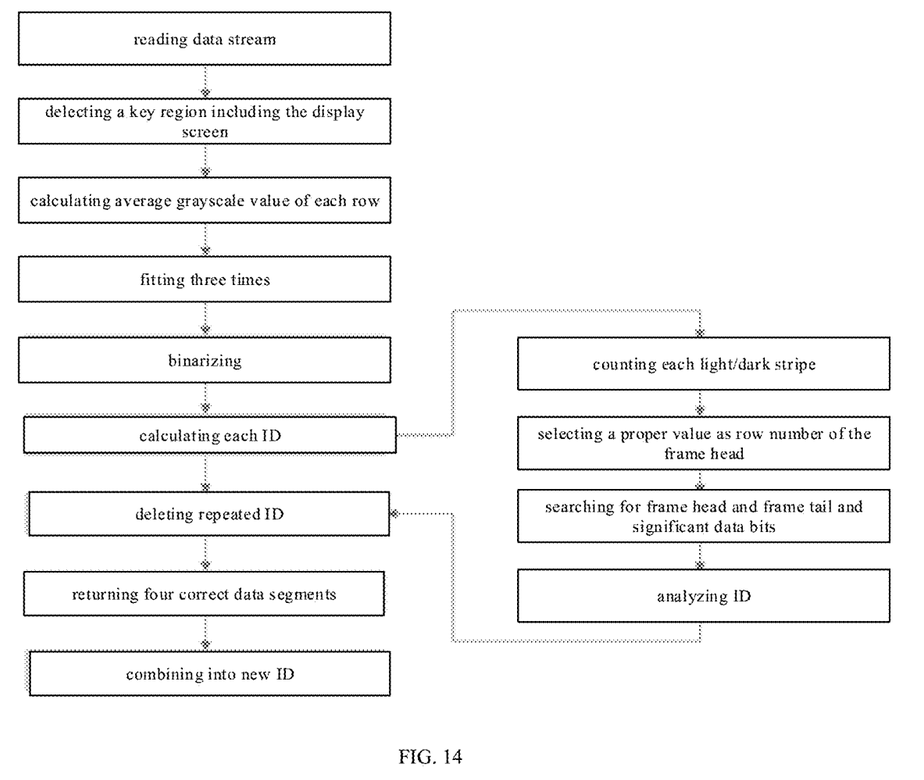
FIG. 14 is a flowchart of decoding a bright and dark stripe image according to an exemplary embodiment of the present disclosure.

In an implementation, the image recognition method may further include: after obtaining the image containing the light signal, extracting a sub-image containing a stripe pattern in the image. For example, after obtaining the image containing the light signal, a sub-image containing bright and dark stripes may be extracted by an image recognition algorithm. In the sub-image, the bright stripe represents that what is transmitted is "1", and the dark stripe represents that what is transmitted is "0". For example, the decoding may be performed according to the flowchart shown in FIG. 14, the terminal reads a data stream (the captured image), selects an area having bright and dark stripes in the image, calculates an average grayscale value of pixels in each row in the area, performs fitting and binarization processing three times on the calculated average grayscale value, and calculates each ID information; counting each bright stripe and each dark stripe in the bright and dark stripe area, selects a proper value as the row numbers of the frame head and the frame tail, searching the frame head, the frame tail and valid data bits, analyzing the ID information, deleting the repeated ID information, feeding back four correct data fragments, and combining the four data fragments into complete ID information. The "1" and "0" included in the image are extracted in order, and the ID information transmitted from the display device can be restored. Before decoding the image, the image may be converted into a gray scale image in order to remove interference information. Under the condition that the image captured by the camera is in YUV format, after the Y is extracted, the gray scale image can be directly obtained.

Figure 13:
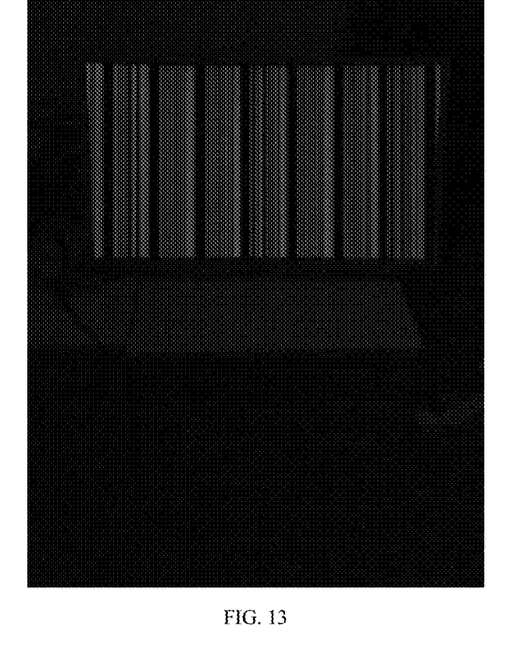
FIG. 13 is a diagram of an image obtained by a terminal photographing a screen of a display device according to an exemplary embodiment of the present disclosure.
Figure 15:
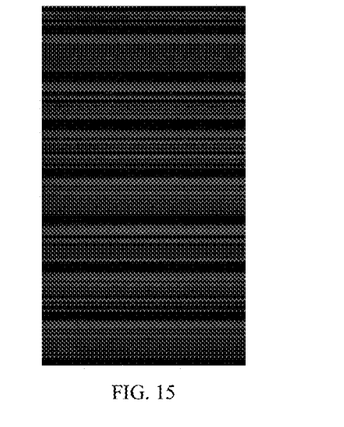
FIG. 15 is a schematic diagram of a bright and dark stripe image extracted from an image photographed by a terminal according to an exemplary embodiment of the present disclosure.

In an implementation, when the terminal is far from the display device, the display screen of the display device occupies only a small portion of the image captured by the terminal, as shown in FIG. 13, directly decoding the entire image has high complexity and low accuracy, so it is necessary to extract a region containing portions of bright and dark stripes from the image for decoding, in such case, the region should contain as much stripe information as possible. Based on such situation, the grayscale image may be binarized firstly, a position of the display screen is found by determining a center of mass (which may be understood as the center of a region containing the bright and dark stripes), and then the center of mass is used as the center, and a proper distance (the distance may be preset according to the size of the display screen of the display device) may be extended from the center towards upwards, downwards, leftwards and rightwards respectively, so that the region does not exceed the range of the display screen and contains stripe information as much as possible. Meanwhile, a left width and a right width of the stripe region are moderate, if these widths are too large, the operation complexity is too high, and if the widths are too small, a large error may be brought when a black edge is selected. FIG. 15 is an image of a stripe region extracted from FIG. 13, in which dark stripes (black) represent "0" and light stripes (gray) represent "1".

In an implementation, decoding the light signal into the code may include: decoding the sub-image to obtain the code. For example, during encoding, the frame head and the frame tail are respectively set to "1111" and "0000", and each frame has a length of 24 bits (see FIG. 16). When searching for the frame head and the frame tail, the 4 bits of data at a current position in the signal are required to accord with the frame head, and meanwhile the 4 bits with an interval of 16 bits from the current position are required to accord with the frame tail. By using such strict method, the frame head and the frame tail searched are more reliable, resulting in a more accurate detection result. After finding the frame head and the frame tail, performing Manchester decoding on the data fragment between the frame head and the frame tail. According to the coding rule, the complete ID is divided into 4 segments to be transmitted, therefore, each data segment is placed in an output buffer, and after the 4 segments are received, the 4 segments are spliced into the complete ID, and the code corresponding to the image displayed by the display device is obtained.

Figure 17:
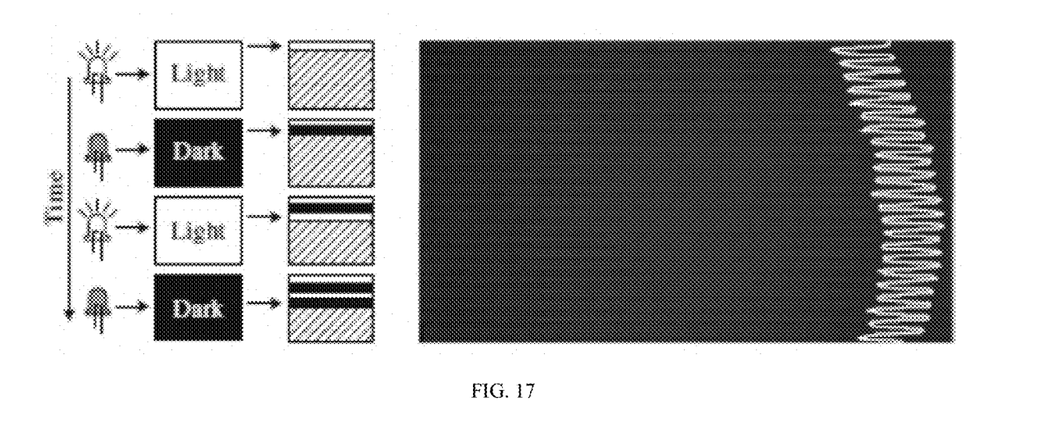
FIG. 17 is a schematic diagram illustrating receiving, by a camera of a terminal, a high-frequency signal emitted from a backlight of a display device according to an exemplary embodiment of the present disclosure.

In an implementation, the receiving the light signal output by the display device displaying the image at the preset receiving frequency may include: capturing the image displayed by the display device through the camera at preset light sensitivity and exposure rate to obtain the image containing the light signal. Still taking the terminal being a mobile phone as an example, the terminal receives a high-frequency signal emitted by the backlight by using a rolling shutter effect of the camera of the mobile phone. As shown in FIG. 17, image sensors of the camera are exposed line by line, and the exposure time of each line is the same, i.e. different sensors are made sensitive to light at different times until all the image sensors are exposed. Therefore, this effect can be used to record the change in light intensity during the frame exposure time, and an image with alternate bright and dark stripes as shown in FIG. 15 is formed, and after decoding the image, the transmitted code information can be restored.

The embodiment of the present disclosure realizes the communication between the camera of the terminal and the backlight of the LCD of the display device by using the visible light communication technology. The display device accurately matches the information transmitted by the backlight with the image displayed by the display device, and uses the backlight to transmit the extension information of the currently displayed image, so that when the display device plays the dynamic or still image, the user can receive the extension information of the display screen through the camera of the mobile phone, which can realize the rapid recognition of the image displayed by the display device, the method of the embodiment of the present disclosure may be applied to LCD display apparatuses such as advertising machines, digital art picture screens and the like, and the user can obtain payment information related to an image and extension information related to a specific image after recognizing the image through the mobile phone. The method does not have influence on the normal visual experience of the user, and can realize relatively dense deployment, for example, the interval between different display images may be 30 cm, and the recognition accuracy is higher.

Figure 18:
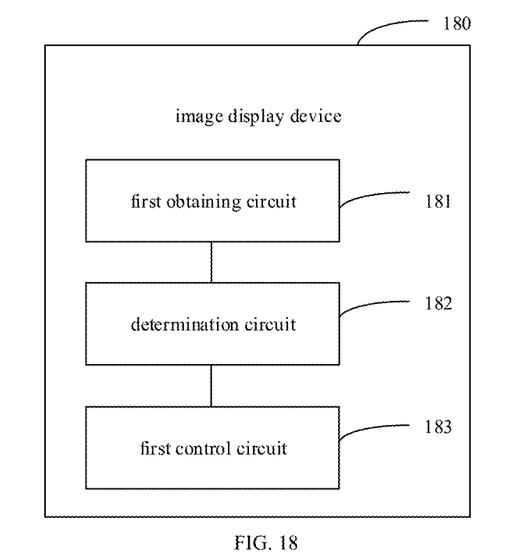
FIG. 18 is a block diagram of an image display device according to an exemplary embodiment of the present disclosure.

FIG. 18 is a block diagram of an image display device according to an exemplary embodiment, and as shown in FIG. 18, the display device 180 includes:

- a first obtaining circuit 181 configured to obtain an image to be displayed in an object to be played;
- a determination circuit 182 configured to determine a code corresponding to the image;
- a first control circuit 183 configured to control the display device to play the object to be played, and output a light signal corresponding to the code when the image is displayed.

In an implementation, the determination circuit may include: a first extraction sub-circuit configured to extract a first macroblock from a preset position of the image; and a first determination sub-circuit configured to determine the code corresponding to the image according to the first macroblock.

In an implementation, the determination circuit may include: a second extraction sub-circuit configured to extract a value corresponding to each pixel point in the first macroblock, where the value corresponding to each pixel point is obtained by replacing the pixel value of each pixel point according to a preset mapping relation, and in the preset mapping relation, a same type of pixels correspond to a same preset value; and a coding sub-circuit configured to code the value corresponding to each pixel point by using a preset coding rule to obtain the code corresponding to the image.

In an implementation, the determination circuit may include: an obtaining sub-circuit configured to obtain image feature information of the first macroblock; and a second determination sub-circuit configured to determine a preset code corresponding to the image feature information and taking the obtained code as the code corresponding to the image.

In an implementation, the control circuit is operable to: control a display panel of the display device to display the image, and synchronously control a backlight assembly of the display device to output the light signal corresponding to the code.

In an implementation, the object to be played may include at least two frames of images, and the display device further includes: a replacing circuit configured to replace the pixel value of each pixel point in the macroblock information of the preset position of each image in the at least two frames of images with a preset value according to the preset mapping relation before the image is obtained, where in the preset mapping relation, a same type of pixels correspond to a same preset value, and the object to be played is obtained; or extract image feature information from the macroblock of the preset position of each image in the at least two frames of images, and establish a corresponding relation between the image feature information and the preset code.

Figure 19:
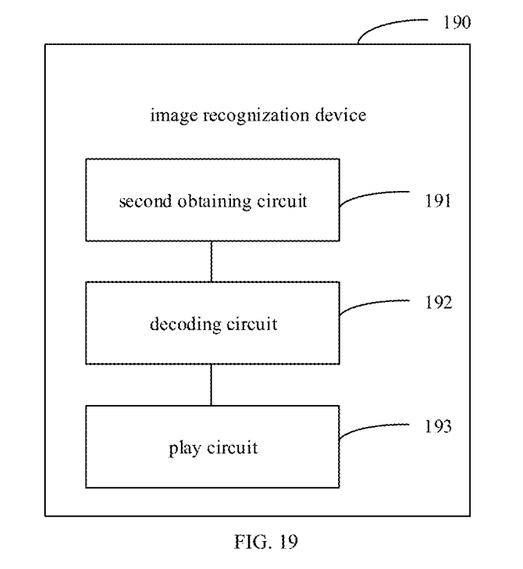
FIG. 19 is a block diagram of an image recognition device according to an exemplary embodiment of the present disclosure.

FIG. 19 is a block diagram of an image recognition device applied to a terminal according to an exemplary embodiment, and as shown in FIG. 19, the image recognition device 190 includes:

- a second obtaining circuit 191 configured to obtain a light signal output by the display device displaying an image, where the light signal corresponds to a code of the image;
- a decoding circuit 192 configured to decode the light signal to obtain the code; and
- a play circuit 193 configured to obtain and play extension information corresponding to the image based on the code.

In an implementation, the terminal may include a camera, and the second obtaining circuit may include: a second control sub-circuit configured to control the camera to switch to a preset light sensitivity and a preset exposure time; and a capturing sub-circuit configured to capture the image displayed by the display device through the camera at the preset sensitivity and exposure time to obtain an image containing the light signal.

In an implementation, the image recognition device 190 may further include: an extraction circuit configured to extract a sub-image containing a stripe pattern in the image containing the light signal after the image is obtained.

In an implementation, the decoding circuit may be configured to: decode the sub-image to obtain the code.

In an implementation, the play circuit may include: a third determination sub-circuit configured to determine a type of the extension information according to the code; and a play sub-circuit configured to play the extension information through a playing tool corresponding to the type of the extension information.

An embodiment of the present disclosure further provides an electronic apparatus, which includes a memory, a processor, and a computer program stored in the memory and executable on the processor, where the processor implements the image display method as described above or the image recognition method described above when executing the program.

An embodiment of the present disclosure further provides a non-transitory computer-readable storage medium storing computer instructions for causing the computer to execute the image display method as described above or the image recognition method as described above.

Figure 16:
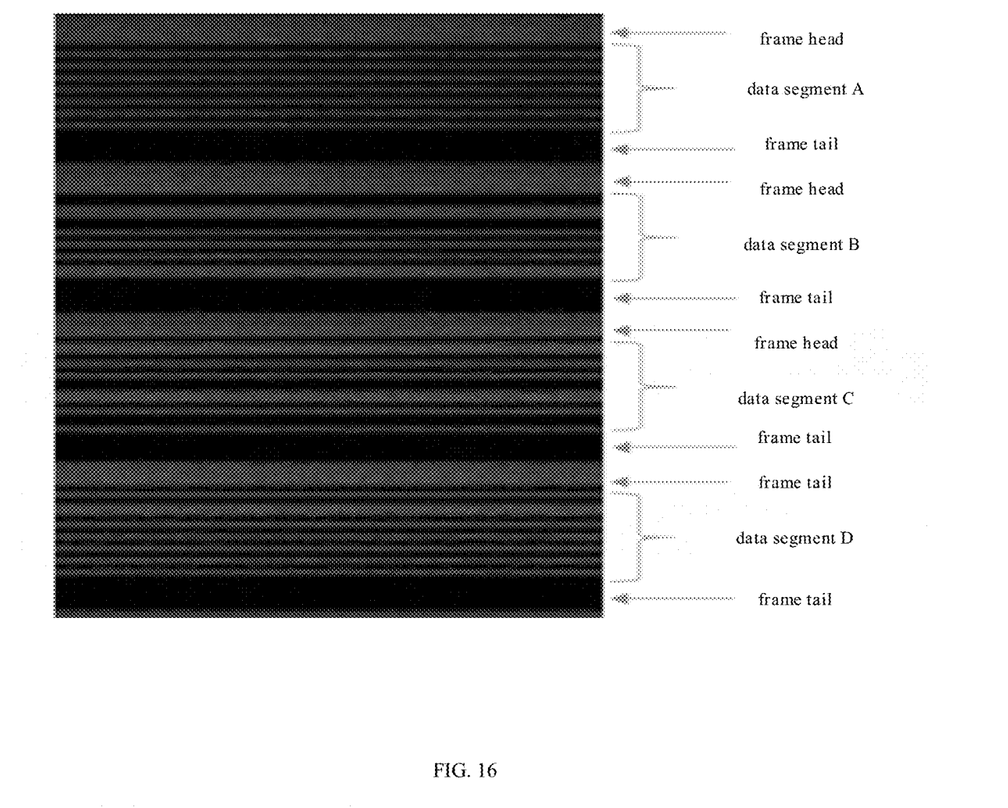
FIG. 16 is a schematic diagram illustrating a correspondence relationship between stripes of bright and dark stripes and ID information according to an exemplary embodiment of the present disclosure.
Figure 20:
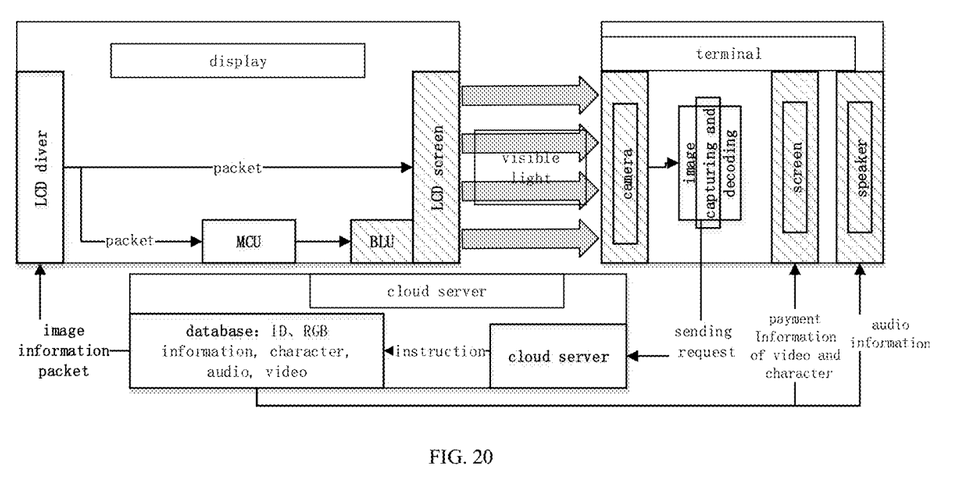
FIG. 20 is a block diagram of an image system according to an exemplary embodiment of the present disclosure.

An embodiment of the disclosure further provides an image system, which may include the image display device as described above and the image recognition device as described above. FIG. 20 is a block diagram of an image system according to an exemplary embodiment, and as shown in FIG. 20, the display device is exemplified by a display, the display may include an LCD driver, an MCU, a BLU (Back Light Unit), and an LCD display screen, the terminal may include a camera, an image capturing and decoding device, a display screen, and a speaker, and as shown in FIG. 16, the cloud server calls image information from a database and transmits the image information to the display, the LCD display normally displays an image, and the backlight LED simultaneously transmits ID information corresponding to the displayed image. The user calls the camera through the App on the terminal to receive the ID information, the decoded ID information is transmitted to the cloud server, and the cloud server transmits information such as audio, video and characters to the terminal according to the ID information, and the information is played through the display screen, a loudspeaker and the like of the terminal.

In this disclosure, the terms "first," "second," "third," and "fourth" are used for descriptive purposes only and are not to be construed as indicating or implying relative importance. The term "plurality" means two or more unless explicitly defined otherwise.

The above description is only exemplary embodiments of the present disclosure and is not intended to limit the present disclosure, and various modifications and changes may be made to the present disclosure by those skilled in the art.

Any modification, equivalent replacement, or improvement made within the spirit and principle of the present disclosure should be considered to be included in the protection scope of the present disclosure.

Those of ordinary skill in the art will understand that: the above description is intended only to illustrate specific embodiments of the present disclosure, and should not be taken as limiting to the disclosure, and any modifications, equivalents, improvements and the like made within the spirit and principle of the present disclosure should be included within the scope of the present disclosure.

The invention claimed is:

1. An image display method, comprising:
obtaining an image to be displayed in an object to be played;
determining a code corresponding to the image to be displayed; and
controlling a display panel of a display device to display the image to be displayed, and synchronously controlling a backlight assembly of the display device to output a light signal corresponding to the code.

2. The method of claim 1, wherein the determining the code corresponding to the image to be displayed comprises:
extracting a first macroblock from a preset position of the image; and
determining the code corresponding to the image to be displayed according to the first macroblock.

3. The method of claim 2, wherein the determining the code corresponding to the image to be displayed according to the first macroblock comprises:
extracting a value corresponding to each pixel point in the first macroblock, wherein the value corresponding to each pixel point is obtained by replacing a pixel value of each pixel point according to a preset mapping relation, and in the preset mapping relation, a same type of pixels correspond to a same preset value; and
coding the value corresponding to each pixel point by using a preset coding rule to obtain the code corresponding to the image.

4. The method of claim 2, wherein the determining the code corresponding to the image to be displayed according to the first macroblock comprises:
obtaining image feature information of the first macroblock; and
determining a preset code corresponding to the image feature information, and taking the obtained code as the code corresponding to the image to be displayed.

5. The method of claim 1, wherein the object to be played comprises at least two frames of images, the method further comprising:
before the image to be displayed is obtained, replacing a pixel value of each pixel point in macroblock information of a preset position of each image in the at least two frames of images with a preset value according to a preset mapping relation, wherein in the preset mapping relation, a same type of pixels correspond to a same preset value, and the object to be played is obtained; or
extracting image feature information from a macroblock of a preset position of each image in the at least two frames of images, and establishing a corresponding relation between the image feature information and a preset code.

6. The method of claim 1, wherein the light signal comprises at least one of a type of a called object and retrieval information of the called object.

7. An electronic apparatus, which comprises a memory, a processor and a computer program stored in the memory and executable on the processor, wherein the processor implements the image display method of claim 1 or an image recognition method when executing the computer program, wherein
the image recognition method is applied to a terminal and comprises:
obtaining a light signal output by a backlight assembly of a display device displaying an image, wherein the light signal corresponds to a code of the image;
decoding the light signal to obtain the code; and
obtaining and playing extension information corresponding to the image based on the code.

8. A non-transitory computer-readable storage medium, storing computer instructions for causing a computer to execute an image display method according to claim 1 or an image recognition method, wherein
the image recognition method is applied to a terminal and comprises:
obtaining a light signal output by a backlight assembly of a display device displaying an image, wherein the light signal corresponds to a code of the image;
decoding the light signal to obtain the code; and
obtaining and playing extension information corresponding to the image based on the code.

9. An image recognition method applied to a terminal, and the method comprises:
obtaining a light signal output by a backlight assembly of a display device displaying an image, wherein the light signal corresponds to a code of the image;
decoding the light signal to obtain the code; and
obtaining and playing extension information corresponding to the image based on the code.

10. The method of claim 9, wherein the terminal comprises a camera, and the obtaining the light signal output by the display device displaying the image comprises:
controlling the camera to switch to a preset light sensitivity and a preset exposure time; and
capturing the image displayed by the display device by the camera according to the preset light sensitivity and the preset exposure time to obtain an image containing the light signal.

11. The method of claim 10, further comprising:
after obtaining the image containing the light signal, extracting a sub-image containing a stripe pattern in the image.

12. The method of claim 11, wherein the decoding the light signal to obtain the code comprises:
decoding the sub-image to obtain the code.

13. The method of claim 9, wherein playing the extension information corresponding to the image comprises:
determining a type of the extension information according to the code; and
playing the extension information through a playing tool corresponding to the type of the extension information.

14. An image display device, comprising:
a first obtaining circuit configured to obtain an image to be displayed in an object to be played;
a determination circuit configured to determine a code corresponding to the image to be displayed; and
a first control circuit configured to control a display panel of a display device to display the image to be displayed, and synchronously control a backlight assembly of the display device to output the light signal corresponding to the code.

15. The image display device of claim 14, wherein the determination circuit comprises:
a first extraction sub-circuit configured to extract a first macroblock from a preset position of the image; and
a first determination sub-circuit configured to determine the code corresponding to the image to be displayed according to the first macroblock.

16. The image display device of claim 15, wherein the determination circuit comprises:
a second extraction sub-circuit configured to extract a value corresponding to each pixel point in the first macroblock, wherein the value corresponding to each pixel point is obtained by replacing a pixel value of each pixel point according to a preset mapping relation, and in the preset mapping relation, a same type of pixels correspond to a same preset value; and
a coding sub-circuit configured to code the value corresponding to each pixel point by using a preset coding rule to obtain the code corresponding to the image.

17. The image display device of claim 15, wherein the determination circuit comprises:
an obtaining sub-circuit configured to obtain image feature information of the first macroblock; and
a second determination sub-circuit configured to determine a preset code corresponding to the image feature information and taking the obtained code as the code corresponding to the image to be displayed.

18. The image display device of claim 14, wherein the object to be played comprises at least two frames of images, the image display device further comprises:
a replacing circuit configured to replace a pixel value of each pixel point in macroblock information of a preset position of each image in the at least two frames of images with a preset value according to a preset mapping relation before the image is obtained, wherein in the preset mapping relation, a same type of pixels correspond to a same preset value, and the object to be played is obtained; or
extract image feature information from a macroblock of a preset position of each image in the at least two frames of images, and establish a corresponding relation between the image feature information and a preset code.

19. An image system, comprising the image display device according to claim 14 and an image recognition device, wherein
the image recognition device is applied to a terminal and comprises:
a second obtaining circuit configured to obtain a light signal output by a backlight assembly of a display device displaying an image, wherein the light signal corresponds to a code of the image;
a decoding circuit configured to decode the light signal to obtain the code; and
a play circuit configured to obtain and play extension information corresponding to the image based on the code.

20. An image recognition device, which is applied to a terminal, the image recognition device comprises:
a second obtaining circuit configured to obtain a light signal output by a backlight assembly of a display device displaying an image, wherein the light signal corresponds to a code of the image;
a decoding circuit configured to decode the light signal to obtain the code; and
a play circuit configured to obtain and play extension information corresponding to the image based on the code.

21. The image recognition device of claim 20, wherein the terminal comprises a camera, and the second obtaining circuit comprises:
a second control sub-circuit configured to control the camera to switch to a preset light sensitivity and a preset exposure time; and
a capturing sub-circuit configured to capture the image displayed by the display device through the camera at the preset light sensitivity and the present exposure time to obtain an image containing the light signal.

22. The image recognition device of claim 21, further comprising:
an extraction circuit configured to extract a sub-image containing a stripe pattern in the image after the image containing the light signal is obtained.

23. The image recognition device of claim 22, wherein the decoding circuit is configured to:
decode the sub-image to obtain the code.

24. The image recognition device of claim 20, wherein the play circuit comprises:
a third determining sub-circuit configured to determine a type of the extension information based on the code;
a play sub-circuit configured to play the extension information through a playing tool corresponding to the type of the extension information.

* * * * *